Patented Jan. 13, 1925.

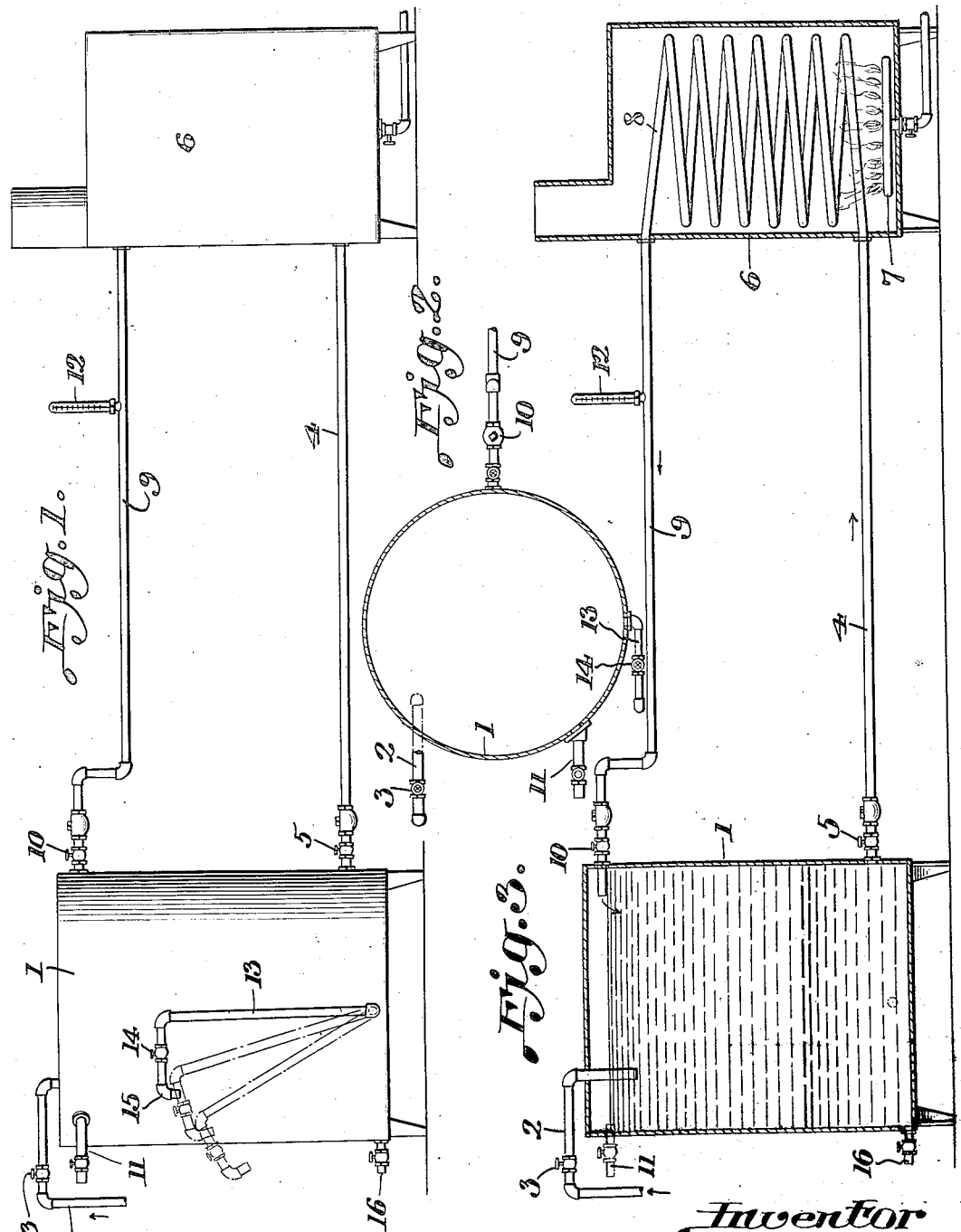

1,523,077

UNITED STATES PATENT OFFICE.

THOMAS M. MELOTT, OF SHAWNEE, OKLAHOMA.

PROCESS AND APPARATUS FOR TREATING OIL.

Application filed March 13, 1923. Serial No. 624,828.

*To all whom it may concern:*

Be it known that I, THOMAS M. MELOTT, a citizen of the United States, and resident of Shawnee, in the county of Pottawatomie and State of Oklahoma, have invented certain new and useful Improvements in Processes and Apparatus for Treating Oil, of which the following is a specification.

It frequently happens that crude oil is contaminated with sand, dirt, water and other impurities which render difficult the distillation thereof. My invention relates to a method and mechanism for giving the crude oil a preliminary mechanical treatment which will separate the oil from whatever impurities happen to be present.

An object of my invention is to provide means for such a preliminary treatment which will be continuous in its operation and will separate the crude oil from all mechanical impurities and permit it to be drawn off for any desired use or further treatment.

Another object is to provide such an apparatus that will be simple in construction and easy to operate, and yet efficient in producing the desired result.

Other objects will be apparent from the following detailed description and the appended claims.

In the drawings:

Figure 1 is an elevation of the apparatus.

Figure 2 is a horizontal section through the oil tank near the top.

Figure 3 is a vertical section.

A tank or container 1 is provided into which the mixture of crude oil and impurities is admitted through a pipe 2 provided with a valve 3. This pipe passes through the top of the container and extends downwardly a few inches, so that its discharge end will be somewhat below the normal level of fluid in the tank. From near the bottom a pipe 4 provided with a valve 5 leads from the tank to a furnace 6 which is heated by a gas burner 7. Instead of the gas burner illustrated, an oil burner or other type of heating apparatus may be employed. The pipe 4 connects with a coil 8 within the furnace which permits heating of the fluid passing therethrough. From the coil 8 a return pipe 9 provided with a valve 10 leads back to the tank and enters it near the top. A valved exit pipe 11 serves to draw off the crude oil from the top as soon as the tank is nearly full.

A thermometer 12 in the return pipe line 9 enables the temperature to be determined at any time. An adjustable overflow pipe 13 rises from near the bottom of the tank and has an annular branch terminating in a downward extension 15. This pipe may be adjusted to various positions as shown in Figure 1, and is retained therein by the friction of the pipe which is threaded into the tank, or means may be provided for holding it in desired position.

Near the bottom of the tank 1 is a valved drain pipe 16, which may be used for the purpose of cleaning out the sediment which collects in the tank after a period of use.

The operation of the device is as follows. The furnace being lighted, the crude oil and impurities in mixture are permitted to enter the tank 1 through the pipe 2. As the tank begins to fill, the mixture passes through the pipe 4 into the coil 8 where it is heated, the temperature to which it is raised depending upon the character of the oil. The mixture becoming heated and somewhat expanded will flow through the return pipe 9 into the tank once more. By the time the tank has become filled to the point shown in the drawings, the treatment will cause the impurities to drop to the bottom of the tank and the oil will collect on the surface of the water and may be drawn off through the pipe 11.

In a short time the entering mixture received from the pipe 2 will be obliged to pass through the heated oil as it drops toward the bottom of the tank, and separation of the oil from the impurities will mainly take place without any of the oil reaching the bottom of the tank. It therefore follows that after a short starting period, there will be practically no oil passing through the pipe 4 to the furnace heated coil, but merely water. This heated water will discharge into the tank at the opposite side from the exit pipe 11, and will keep the temperature of the tank at the desired degree.

If the bottom of the tank becomes filled with mud or other sediment, the valves in the inlet and outlet pipes from the tank may be closed, and the valve in the drain pipe 16 opened, permitting the tank to be cleaned out thoroughly. During the operation of the device, the adjustable discharge pipe 13 may be set to draw off the water when it reaches any desired height in the tank. This water will be drawn from the bottom at all times and will tend to carry off all but the heavier portion of the sediment, rendering use of the drain pipe 16 necessary only at infrequent intervals. It may be entirely omitted if desired.

It is not intended to raise the oil to a temperature which will result in any appreciable portion thereof being vaporized, and if there is some vapor in the beginning, there will not be after the device is in normal operation and practically no oil is passing through the heated coil.

The various parts of the apparatus may be constructed in any desired manner and of any suitable material. While the tank has been shown closed, it may be open at the top if desired. Size and form may be varied according to the amount of oil that it is necessary to treat. The pipes 2, 9 and 11 should connect with the tank at widely separated points as shown in Figure 2. Various changes may be made without departing from the spirit of the invention, which is to be regarded as limited only by the scope of the appended claims.

I claim as my invention:

1. A process of treating oil for the mechanical separation of its impurities which comprises supplying the impure oil continuously to a container, conducting said oil from the bottom of the container to a heating coil, heating said oil to a temperature lower than that sufficient to form gas, conducting the heated oil back to the top of the tank for direct mixture with the incoming impure oil, drawing off the purified oil from the top of the container, and drawing off the impurities from the lower portion of the tank, the whole as a continuous process.

2. An apparatus for the mechanical treatment of impure oil comprising a container, means for supplying impure oil to the top thereof, a heating coil at a distance from the container, means for heating said coil, means for conducting oil from the bottom of the tank to the heating coil, means for delivering the heated oil to said container at a point above the point of delivery of the impure oil, means for withdrawing the purified oil from the container at a point above the point of delivery of the impure oil, and adjustable means for withdrawing the separated impurities from the bottom of the container but maintaining any desired level thereof within the container.

In testimony whereof, I have hereunto subscribed my name.

THOMAS M. MELOTT.